United States Patent [19]

Hagelin

[11] 3,868,641

[45] Feb. 25, 1975

[54] CONTROL SYSTEM PARTICULARLY FOR INTERLOCKING INSTALLATIONS FOR RAILWAY OPERATION

[75] Inventor: Gunnar Johannes Hagelin, Skarholmen, Sweden

[73] Assignee: Telefonaktiebolaget L. M. Ericsson, Stockholm, Sweden

[22] Filed: Jan. 11, 1974

[21] Appl. No.: 432,681

[30] Foreign Application Priority Data
Jan. 29, 1973 Sweden .............................. 7301177

[52] U.S. Cl. ............................ 340/163, 340/147 R
[51] Int. Cl. ............................................. H04q 9/00
[58] Field of Search ............ 340/163, 147 R, 149 R

[56] References Cited
UNITED STATES PATENTS
3,697,953  10/1972  Schoenwitz ..................... 340/163 R

*Primary Examiner*—Harold I. Pitts
*Attorney, Agent, or Firm*—Hane, Baxley & Spiecens

[57] ABSTRACT

A control system for interlocking installations for railway operation. The system includes controlled devices, condition indication devices and a central control unit with a computer. The central control unit receives condition information from the condition indicating devices and sends orders to the controlled devices. The memory of the computer contains two instruction sequences identical in view of their result for treating each of the controlled and indicating devices and two separate memory fields for storing the information necessary for carrying out said two instruction sequences. A definite logical relation exists between at least the address in the respective memory fields, the bit significance in the respective memory words and the bit representation in the respective memory words. The control devices receive control orders according to both instruction sequences and upon correspondance between them carry out an order. The condition indicating devices give two separate condition information data having the logical relation to each other defined by the organization of the memory field.

1 Claim, 3 Drawing Figures

CONTROL SYSTEM PARTICULARLY FOR INTERLOCKING INSTALLATIONS FOR RAILWAY OPERATION

BACKGROUND OF THE INVENTION

The present invention refers to an interlocking installation particularly an interlocking installation for railway operation including controlled means, condition indicating means and a central control unit which comprises a computer and which receives condition information from the condition indicating means and sends orders to the controlled means, the necessary security function being obtained by the program of the computer.

Previously known control systems of said type have the drawback that they for security reasons necessitate the use of double computers which increase the investment costs considerably. Furthermore, when using double computers at least one further computer is necessary in order to maintain the security if an operation fault occurs.

The purpose of the present invention is to obtain a computer controlled system using computers as coontrol means, but in which one computer is sufficient in order to obtain the necessary security and only one reserve computer is necessary in order to allow that a possible repair should be carried out with a maintained security.

The control system according to the invention is characterized in that the memory of the computer contains two instruction sequencies being identical in view of their meaning for treating each of the controlled and of the indicating means, and two separate memory fields for storing the information necessary for carrying out said two instruction sequencies, a definite logical relation existing between the respective fields concerning at least one of the following parameters:

a. the addresses in the respective memory fields, b. the bit significance in the respective memory words, c. the bit representation in the respective memory words, and that the controlled means are adapted to receive control orders concerning a required function computed according to both instruction sequencies and upon correspondance between the latter carry out an order, and said condition indicating means are adapted to give two separate condition information data which have the logical relation to each other defined by said organization of the memory field.

BRIEF DESCRIPTION OF THE DRAWING

The invention will be explained more in detail by means of an embodiment with reference to the enclosed drawing in which FIG. 1 diagrammatically shows a railway track in a railway station with associated luminous signals.

DESCRIPTION OF THE PREFERRED EMBODIMENT

Figure 1:
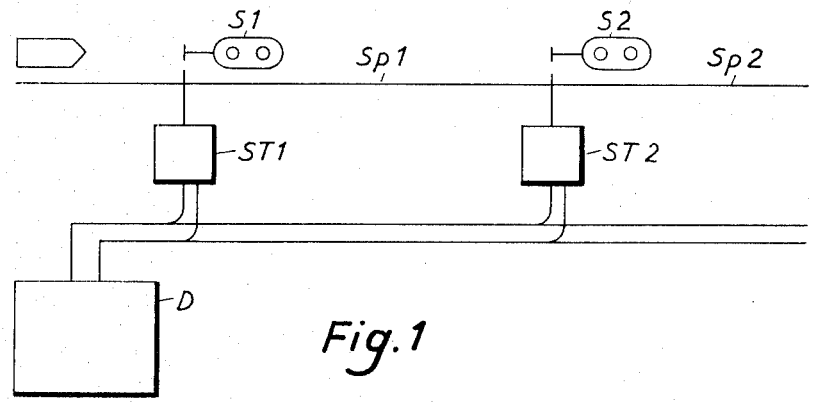

FIG. 1 shows diagrammatically a railway track, for example in a railway station, with two luminous signal devices S1, S2 located at the beginning of their associated track section $Sp1$, $Sp2$ respectively. The signals have each a control and indication equipment $St1$, $St2$ which receives control information from a central computer D and supplies indication information to the latter. According to the idea of the invention each control and indication equipment has double controlling and indicating functions consisting therein that in order to obtain an operation it is necessary that two separate control instructions having a definite relation to each other arrive and the indications are transmitted to the computer in the form of two separate items of indication information having a definite relation to each other. Thus the computer produces for each controlled means two separate control instructions having a definite relation to each other, said separate indication information being used as it will be explained more in detail.

Figure 2:
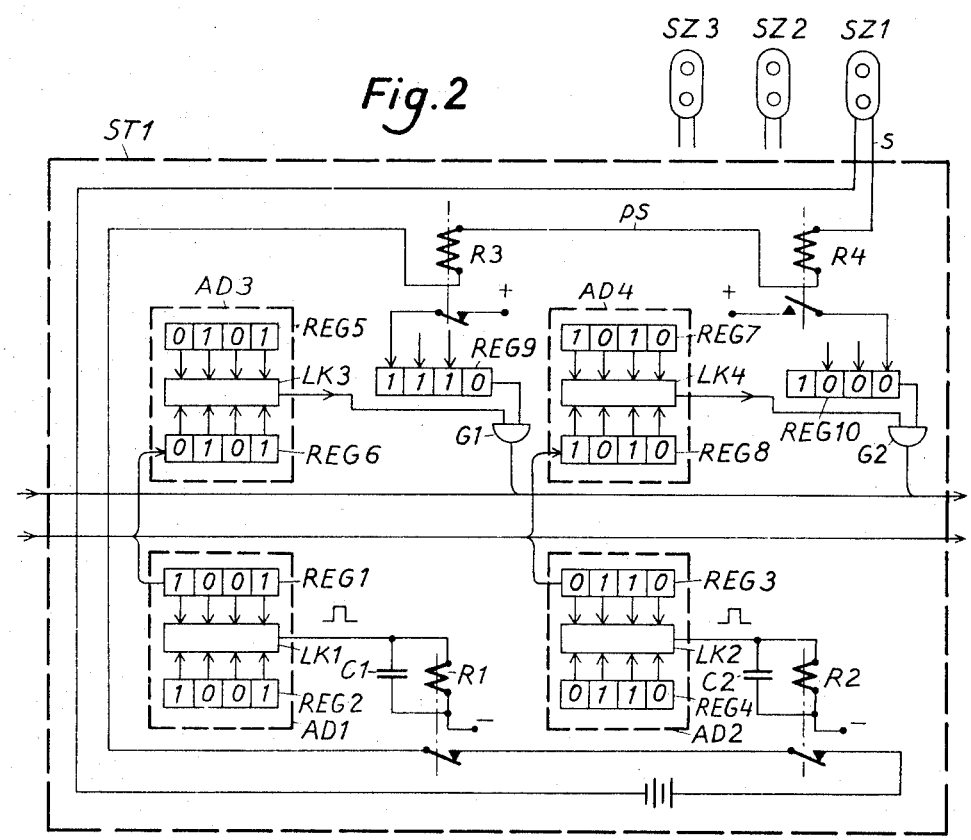
FIG. 2 shows a logical circuit of a control and indication equipment.

FIG. 2 shows a control and indication equipment ST1 in a substantially simplified form. R1 and R2 designate two relays which each have to be operated in order to allow that the signal SZ1 should be activated and show for example green light. C1 and C2 designate capacitors which are parallel connected with the relay windings in order to allow to maintain the relays operated between two subsequent incoming operating pulses which in a known manner have to arrive with a definite minimum interval in order that the signal should not change to stop condition.

The equipment ST includes two addressing means AD1, AD2 which can only be operated by the specific addresses associated with the equipment which addresses are sent out from the central computer for control purposes, and two further addressing means AD3, AD4 which can only be operated by the specific addresses associated with the equipment which addresses are sent out from the computer in order to demand condition information signals from the equipment.

In order to be operated the relays are addressed each separately from the central computer, the relay R1 having the address 1001 and the relay R2 having the address 0110. The addressing means are of the conventional type consisting of for example two registers REG1 and REG2, in the first of which is recorded the identity number or address of the relay R1, and in the other of which is recorded each address obtained from the computer through the connecting line. Upon correspondence between said two addresses a logical circuit LK1 is influenced which connects a pulse source to the winding of the relay R1. The addressing from the computer is carried out with equal intervals of for example 1 s, and the capacitor C1 is so dimensioned that in the case an addressing fail to appear the relay R1 releases. Exactly the same is valid for the operation of the addressing means AD2 and the relay R2 except that the address is sent out as a result of a computation according to the second of the two instruction sequencies mentioned above which, however, is carried out within said 1 s period.

Also the demand of a condition indication is carried out by addressing of addressing means AD3, AD4 within said 1 s period. The condition indication is obtained from two different sources, according to the example two relays R3, R4, the windings of which are connected in series in the operation loop ps of the luminous signal so that they are activated in the operated condition of the relays R1, R2. According to the idea of the invention is is required that from the contacts of the relays R3, R4 such items of condition information are obtained which are the logically inverted values of each other for which reason the relay R3 is provided with a make contact and the relay R4 is provided with a break contact which in a buffer register REG9 associated with the relay R3 gives a binary one, whereas in a buffer register REG10 associated with the relay R4 gives a binary zero.

As it will be explained more in detail there is a certain logical relation between the data which are treated by the two different instructions for relay operations which relation means that as well the bit representation as the bit significance is inverted in the indication information sent to the computer. This is shown in FIG. 2 in which the most significant position in the buffer register REG9 contains a one in correspondence to the closed condition of the contact of the relay R3 whereas the smallest significant position in REG10 comprises a zero corresponding to the open condition of the contact of the relay R4. The second and third position in REG9 and the third and second position in REG10 are associated with two further luminous signals SZ2, SZ3 operated by the same equipment, the operating circuits of which signals are not shown in detail, but which each supply his own condition indication signal to the computer. No object is associated with the fourth position in REG9 for which reason it continuously contains a binary zero, whereas the position corresponding to this position in REG10, i.e., the first position, continuously comprises a binary one.

When the address upon a demand for condition information is obtained in for example REG6, the logical circuit LK3 establishes that there is identity with the address recorded in REG5 so that the gate G1 is activated in order to feed out the condition information recorded in REG9 through the common line leading to the computer by means of known feeding out and transmission means (not shown). The feeding out of the contents of the register REG10 is carried out in the same manner upon receiving the address associated with this register.

In the same manner as upon addressing of the relay operating means also upon a demand of condition signal addressing is carried out as a result of two different instructions, the addresses being in definite relation to each other in such manner that if reading out of the register REG9 is carried out by means of the address 0101 the register REG10 is read out by means of the address 1010, i.e., a word in which the bit significance is changed to the bit significance in the first mentioned word. According to the idea of the invention besides the bit significance also the bit representation in the two words may be logically inverted, but this is not shown in the example for the sake of simplicity.

Figure 3:
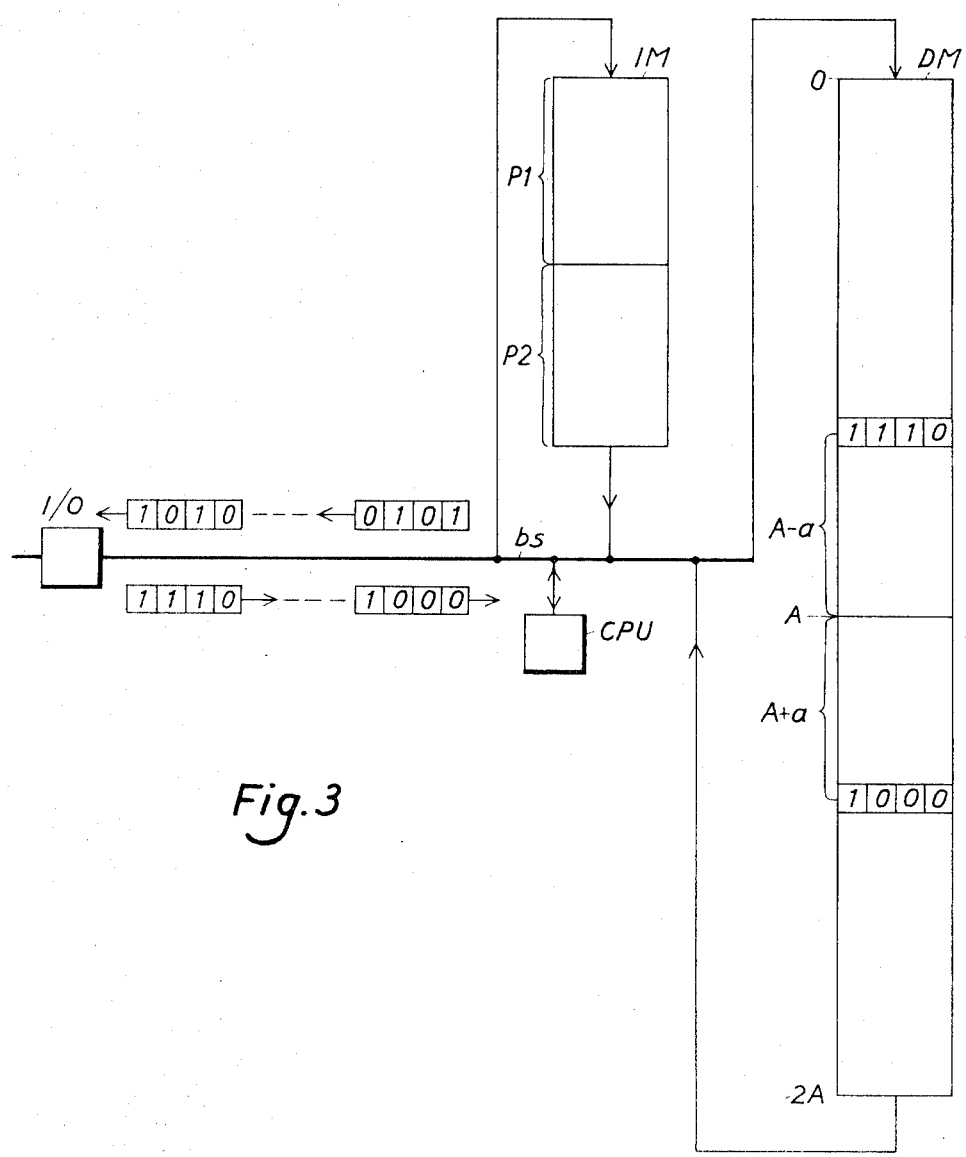
FIG. 3 shows diagrammatically the memory organization of the computer.

FIG. 3 shows the organization of the computer where the central unit of the computer is designated CPU which through a common bus bs is in connection with the input and output means I/O and is connected with the memory of the computer which for the sake of clearness is shown as consisting of an instruction memory IM and a data memory DM. The instruction memory contains two separate instruction sequencies P1 and P2 which are treated after each other within a working period, for example 1 s. To each means or type of means which is to be controlled and which should produce an indication signal belongs in each of the two instruction sequencies instructions which are executed in such way that both sequencies carry out the same work but in different manner. Each instruction sequence treats its own part of the data memory. The data memory is organized in such manner that the data concerning all the objects are located in two different fields in which the word addresses for such words that contain data concerning the same object are reversed, for example the data concerning the condition of the means ST1 is located at the address A−a on one hand and at the address A+a on the other hand.

Corresponding to the example shown in FIG. 2 the data information 1110 which has been read out from REG9 is recorded at the address A−a (for example 0010), whereas the information 1000 which has been read out from REG10 is recorded at the address A+a (for example 1101) which is reversed relatively to the first mentioned address around a symmetry axis. As it appears it is not necessary that said addresses should be identical with the addresses by means of which the register REG9 and 10 are selected.

In this manner the two instruction sequencies will work with data from two data fields in which two orders associated with the same means have (a) reversed address, (b) reversed bit significance within the words, (c) inverted binary representation.

By carrying out the computations by means of data of said type it is possible to obtain a sufficient security with a single central unit as there is very little chance that two equal and erroneous orders sent to the controlled objects may occur. The bit representation prevents as a matter of fact that equal faults cause the same result on two outputs.

We claim:

1. A control system particularly for interlocking installations for railway operation including controlled means, condition indicating means and a central control unit comprising a computer, means for receiving condition information from said condition indicating means in said control unit, and means for sending orders to said controlled means from said control unit, an instruction memory in the computer containing two instruction sequencies causing identical result in treating each of the controlled and indicating means, and a data memory having two separate memory fields for the two respective instruction sequencies to be carried out, a definite logical relation existing between at least one of the following parameters:
   a. the addresses of the respective memory fields,
   b. the bit significance in the respective memory words,
   c. the bit representation in the respective memory words, said controlled means comprising receiver means for receiving control orders each computed according to one of said instruction sequencies and operating upon agreement between said two control orders, and information sending means in said indicating means for sending two separate condition information data having a logical relation to each other defined by the logical relation of the content in the memory fields.

* * * * *